United States Patent
Peana et al.

(10) Patent No.: US 10,404,935 B1
(45) Date of Patent: Sep. 3, 2019

(54) SYSTEM AND METHOD OF CORRECTING DISCONTINUITIES OF LIGHT INTENSITIES OF DISPLAYS

(71) Applicant: Dell Products L.P., Round Rock, TX (US)

(72) Inventors: Stefan Peana, Austin, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/151,393

(22) Filed: Oct. 4, 2018

(51) Int. Cl.
| | | |
|---|---|---|
| G09G 5/00 | (2006.01) | |
| H04N 5/58 | (2006.01) | |
| G01J 1/42 | (2006.01) | |
| G06F 3/14 | (2006.01) | |
| G09G 3/32 | (2016.01) | |

(52) U.S. Cl.
CPC .............. *H04N 5/58* (2013.01); *G01J 1/4204* (2013.01); *G06F 3/1446* (2013.01); *G09G 3/32* (2013.01); *G09G 5/00* (2013.01); *G09G 2320/0626* (2013.01); *G09G 2360/144* (2013.01); *G09G 2360/16* (2013.01)

(58) Field of Classification Search
CPC .... G09G 5/00; G09G 3/32; G09G 2320/0626; G09G 2360/144; G09G 2360/16; H04N 5/57; H04N 5/58; G01J 1/4204; G06F 3/1446
USPC .......... 345/1.1, 589, 633, 690; 348/602, 739
See application file for complete search history.

(56) References Cited

U.S. PATENT DOCUMENTS

| | | | | |
|---|---|---|---|---|
| 5,687,307 | A * | 11/1997 | Akisada | G06F 3/011 345/419 |
| 8,948,545 | B2 * | 2/2015 | Akeley | H04N 9/045 382/312 |
| 8,994,757 | B2 * | 3/2015 | Surati | H04N 5/74 345/690 |
| 10,242,649 | B2 * | 3/2019 | Chappalli | G09G 5/003 |
| 2008/0246781 | A1 * | 10/2008 | Surati | H04N 5/74 345/690 |
| 2009/0010538 | A1 * | 1/2009 | Kim | H04N 5/202 382/167 |

(Continued)

OTHER PUBLICATIONS

Semiconductor, R. O. H. M. "Digital 16bit Serial Output Type Ambient Light Sensor IC." No. 9046 (2011); 21 pages.

*Primary Examiner* — Trang U Tran
(74) *Attorney, Agent, or Firm* — Baker Botts L.L.P.

(57) ABSTRACT

In one or more embodiments, one or more systems, methods, and/or processes may determine, via at least one luminance intensity sensor, multiple display luminance values of each display of multiple displays associated with coordinates of the display; may determine a mapping from the coordinates to multiple mean luminance values based at least on each multiple display luminance values of each display of the multiple displays; may determine a correction mapping based at least on the mapping from the coordinates to the multiple mean luminance values and respective multiple expected luminance values; may install the multiple displays in respective multiple information handling systems that include respective multiple graphics processing units; and may configure the multiple graphics processing units with at least one of the correction mapping and a lookup table based at least on the correction mapping.

20 Claims, 9 Drawing Sheets

(56) References Cited

U.S. PATENT DOCUMENTS

| | | | | |
|---|---|---|---|---|
| 2013/0021349 A1* | 1/2013 | Kohtoku | ............. | G02F 1/13318 |
| | | | | 345/501 |
| 2015/0348502 A1* | 12/2015 | Marcu | ...................... | G09G 5/04 |
| | | | | 345/594 |
| 2016/0048298 A1* | 2/2016 | Choi | ................... | G06F 3/04842 |
| | | | | 715/846 |
| 2018/0349020 A1* | 12/2018 | Jon | ....................... | G06F 3/0488 |

\* cited by examiner

SYSTEM AND METHOD OF CORRECTING DISCONTINUITIES OF LIGHT INTENSITIES OF DISPLAYS

BACKGROUND

Field of the Disclosure

This disclosure relates generally to information handling systems and more particularly to correcting discontinuities of light intensities of displays.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine, via at least one luminance intensity sensor, multiple display luminance values of each display of multiple displays associated with coordinates of the display; may determine a mapping from the coordinates to multiple mean luminance values based at least on each plurality of display luminance values of each display of the multiple displays; may determine a correction mapping based at least on the mapping from the coordinates to the multiple mean luminance values and respective multiple expected luminance values; may install the multiple displays in respective multiple information handling systems that include respective multiple graphics processing units; and may configure the multiple graphics processing units with the correction mapping. In one or more embodiments, the at least one luminance intensity sensor may include at least one camera.

In one or more embodiments, determining the mapping from the coordinates to the multiple mean luminance values based at least on each multiple display luminance values of each display of the multiple displays may include determining multiple arithmetic mean values, multiple geometric mean values, or multiple harmonic mean values. In one or more embodiments, determining the multiple display luminance values of each display of the multiple displays associated with coordinates of the display may include capturing a single image for each display of the multiple displays. For example, determining the multiple display luminance values of each display of the multiple displays associated with coordinates of the display may include determining the multiple display luminance values of each display of the multiple displays from each single image of each display of the multiple displays. In one or more embodiments, capturing the multiple images for each display of the multiple displays may include not capturing an inner segment of the display.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
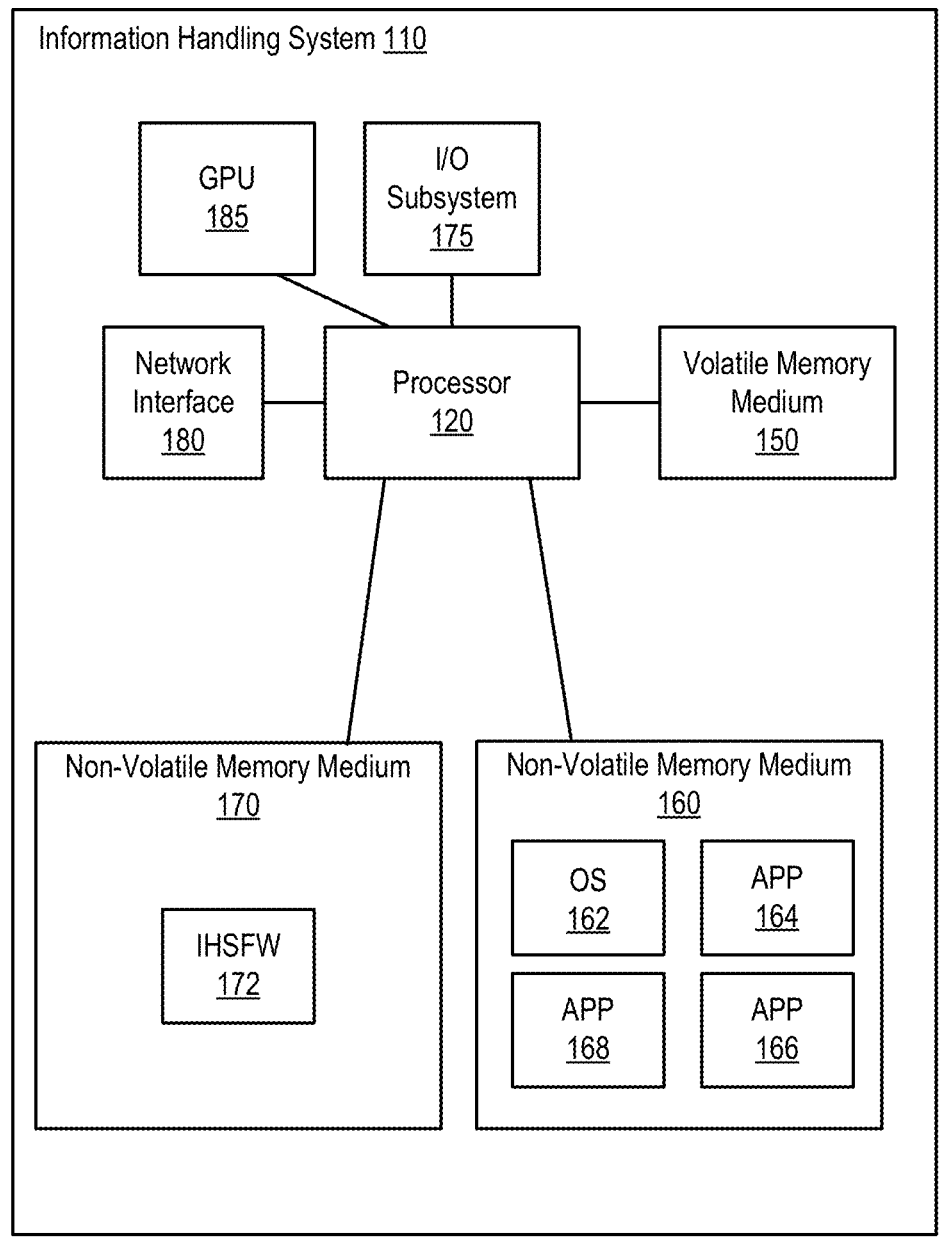
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a display may be or include a liquid crystal display (LCD). For example, the display may include a light source behind the LCD. For instance, the light source may include one or more light emitting diodes (LEDs). In one or more embodiments, the LEDs may be placed at one or more ends of the LCD. For example, light from the LEDs may travel through the display via internal reflection. For instance, an intensity of light may be greater near the LEDs.

In one or more embodiments, as the light travels through the display, via internal reflection, one or more edges of the display may reflect light, which may create one or more discontinuities of light intensities at the one or more edges of the display. For example, the one or more discontinuities of light intensities at the one or more edges of the display may be referred to as leakage. In one or more embodiments, the one or more discontinuities of light intensities at the one or more edges of the display may be more pronounced as a size of a bezel associated with the display decreases. In one or more embodiments, a LCD may be associated with a light intensity bias towards a side of the LCD and/or to a corner of the LCD. For example, with the light intensity bias, the light from the LEDs may not be uniformly distributed through the LCD. While lack of uniformity of light distributed through the LCD may be within a specification, it may affect a graphics quality of the LCD, for instance.

In one or more embodiments, one or more systems, methods, and/or processes may identify the one or more discontinuities of light intensities. In one or more embodiments, the one or more systems, methods, and/or processes may further configure one or more portions of a display system to mitigate and/or to eliminate the one or more discontinuities of light intensities. In one or more embodiments, the LEDs of the display may be modulated. For example, the LEDs of the display may be modulated to reduce and/or to eliminate image artifacts that may be shown by the display. For instance, the image artifacts may effect and/or influence one or more performances of the display. In one or more embodiments, a display may be backlit via the LEDs. For example, a backlight, which may include the LEDs, may be modulated in producing intensities of light emissions of a display. For instance, the backlight may be modulated in enhancing images provided by the display.

In one or more embodiments, data may be collected from multiple displays. In one example, the multiple displays may be of a particular model of display. In a second example, the multiple displays may be of a particular model of information handling system. In another example, the multiple displays may be of a particular manufacturing run. In one or more embodiments, one or more artifacts may impact one or more performances of a display. For example, one or more inconsistencies with of backlights and/or LEDs of displays may be determined. In one instance, the one or more inconsistencies may be associated with a particular model of information handling system. In another instance, the one or more inconsistencies may be associated with of a particular manufacturing run.

In one or more embodiments, light emissions may be determined at various positions of a display. For example, measurements of intensities of light emissions may be determined at positions from edges of the display. For instance, a slope of the measurements of intensities of light emissions may be determined. In one or more embodiments, a slope of the measurements of intensities of light emissions may indicate one or more locations and/or one or more segments of the display that are associated with different one or more performances. In one example, a slope of the measurements of intensities of light emissions may indicate at least one location of the display that is associated with a first performance that is different than a second performance of another location of the display. In another example, a slope of the measurements of intensities of light emissions may indicate at least one segment of the display that is associated with a first performance that is different than a second performance of another segment of the display.

In one or more embodiments, a mean intensity of light emissions may be determined for each segment of the display. In one or more embodiments, a correction may be determined for each segment of the display based at least on the mean intensity of light emissions determined for each segment of the display. For example, light emissions for pixels associated with a segment of the display may be adjusted based at least on the correction associated with the segment of the display. For instance, light emitted from a pixel of the segment may be modulated via controlling light emission and/or via controlling an aperture opening associated with the pixel, such that one or more appropriate amounts of light are transmitted based at least on the correction associated with the segment of the display. In one or more embodiments, the corrections to the segments of the display may abate or mitigate non-uniform contrast associated with the display.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a graphics processing unit (GPU) 185. As illustrated, volatile memory medium 150, non-volatile memory media 160 and 170, I/O subsystem 175, network interface 180, and GPU 185 may be communicatively coupled to processor 120.

In one or more embodiments, one or more of volatile memory medium 150, non-volatile memory media 160 and 170, I/O subsystem 175, network interface 180, and GPU 185 may be communicatively coupled to processor 120 via one or more buses, one or more switches, and/or one or more root complexes, among others. In one example, one or more of volatile memory medium 150, non-volatile memory media 160 and 170, I/O subsystem 175, network interface 180, and GPU 185 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
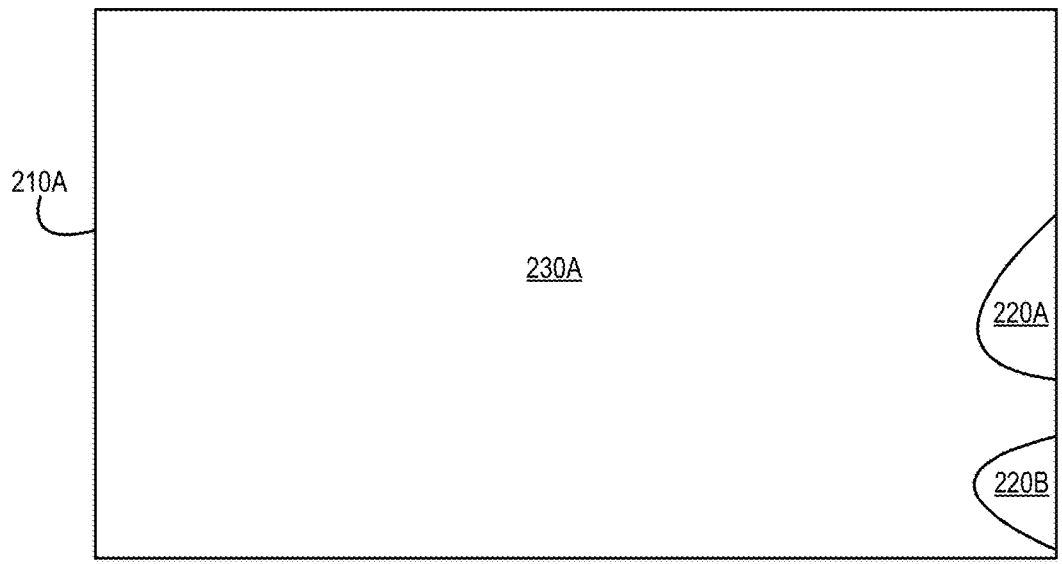
FIGS. 2A and 2B illustrate examples of discontinuities of light intensities of displays, according to one or more embodiments.
Figure 2B:
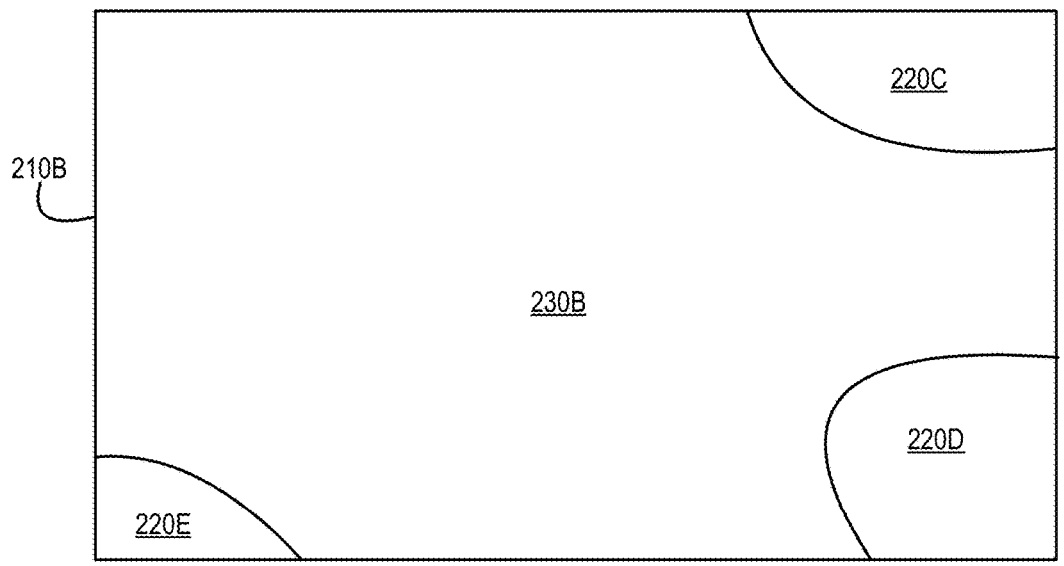

Turning now to FIGS. 2A and 2B, examples of discontinuities of light intensities of displays are illustrated, according to one or more embodiments. As shown in FIG. 2A, a display 210A may include discontinuities of light intensities 220A and 220B. As illustrated in FIG. 2B, a display 210B may include discontinuities of light intensities 220C-220E. In one or more embodiments, display 210 may display an image. For example, one or more discontinuities of light intensities 220 may form and/or may be based at least on the image displayed by display 210. In one or more embodiments, as the light travels through display 210, via internal reflection, one or more edges of the display may reflect light, which may create one or more discontinuities of light intensities 220 at the one or more edges of display 210. For example, one or more discontinuities of light intensities 220 may be associated with one or more respective contrast differences with another portion 230 of display 210. In one instance, discontinuities of light intensities 220A and 220B may be associated with respective contrast differences with another portion 230A of display 210A, as shown in FIG. 2A. In another instance, discontinuities of light intensities 220AC220E may be associated with respective contrast differences with another portion 230B of display 210B, as shown in FIG. 2B. In one or more embodiments, one or more discontinuities of light intensities 220 may be referred to as leakage. In one or more embodiments, a bezel may be applied to display 210. For example, one or more discontinuities of light intensities 220 may be more pronounced as a size of the bezel decreases.

In one or more embodiments, LEDs may be or include organic LEDs (OLEDs). In one example, OLEDs may be driven with a passive matrix (PMOLED). For instance, each row and line in display 210 may be controlled sequentially, such as one by one. In another example, OLEDs may be driven with an active matrix (AMOLED). For instance, controlling OLEDs with AMOLED may include utilizing a transistor backplane that may access and/or may switch each individual pixel on or off, which may permit and/or allow for higher resolution and/or larger display sizes. In one or more embodiments, a pixel of a display may include three LEDs. For example, a pixel of display 210 may include a first LED that emits light in a "red" portion of a visual spectrum, a second LED that emits light in a "green" portion of the visual spectrum, and a third LED that emits light in a "blue" portion of the visual spectrum.

Figure 3A:
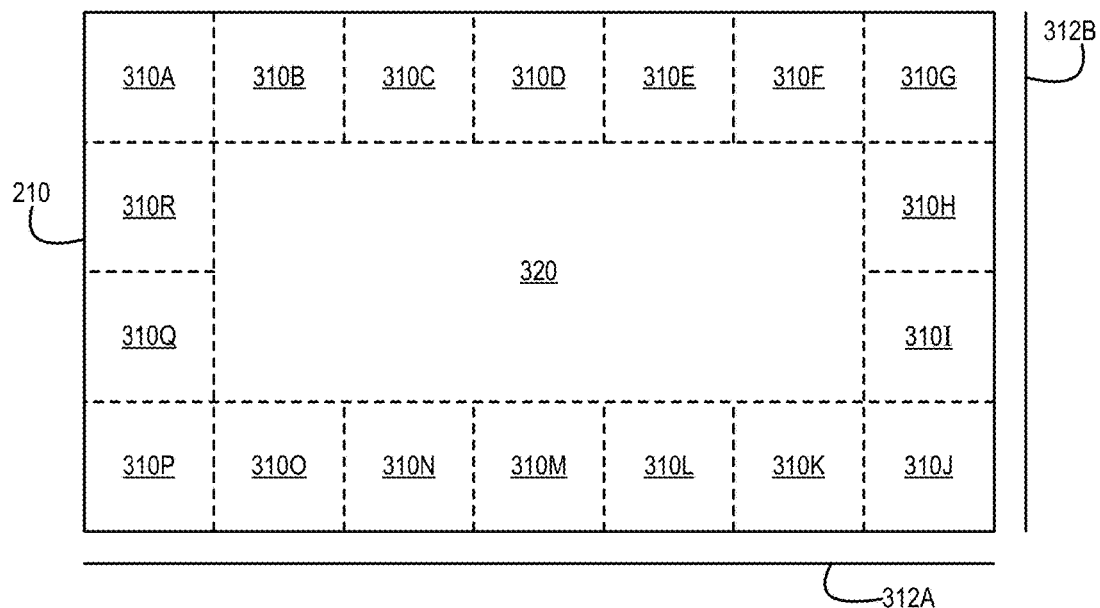
FIGS. 3A and 3B illustrate examples of display segments, according to one or more embodiments.
Figure 3B:
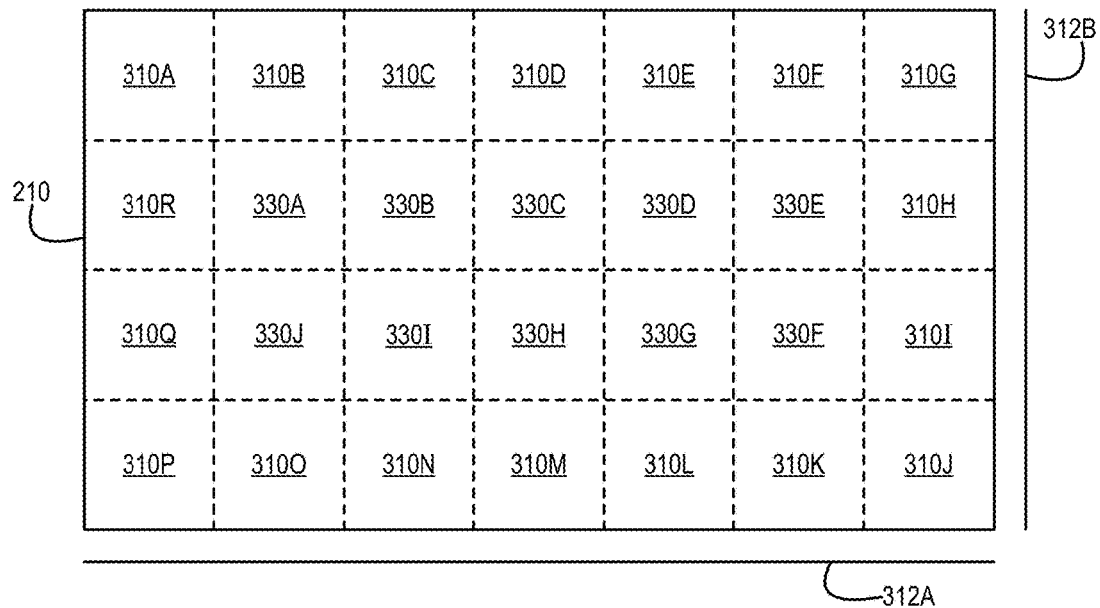

Turning now to FIGS. 3A and 3B, examples of display segments are illustrated, according to one or more embodiments. As shown in FIG. 3A, display 210 may be associated with display segments 310A-310R and 320. As illustrated in FIG. 3B, display 210 may be associated with display segments 310A-310R and 330A-330J. As shown, display 210 may be associated with axes 312A and 312B. In one or more embodiments, a luminance intensity value may be associated with coordinates associated with axes 312A and 312B. In one or more embodiments, a display segment and/or a position of a display segment may be associated with coordinates associated with axes 312A and 312B.

In one or more embodiments, one or more luminance intensity sensors may determine luminance values of one or more of display segments 310A-310R, 320, and 330A-330J, among others. For example, a luminance intensity sensor may provide one or more luminance values for a display segment. In one instance, a luminance intensity sensor may provide a luminance value for a display segment. In another instance, a luminance intensity sensor may provide multiple luminance values at multiple positions of a display segment. In one or more embodiments, a luminance intensity sensor may be or include a camera.

In one or more embodiments, luminance values may be determined for display segments 310A-310R without determining a luminance value for segment 320. For example, not determining one or more luminance values for segment 320 may conserve time and/or energy in determining one or more corrections for one or more displays 210. In one or more embodiments, luminance values may be determined for display segments 310A-310R and a luminance value for segment 320 may be determined. For example, determining a luminance value for segment 320 may be utilized in determining one or more contrast differences.

Figure 3C:
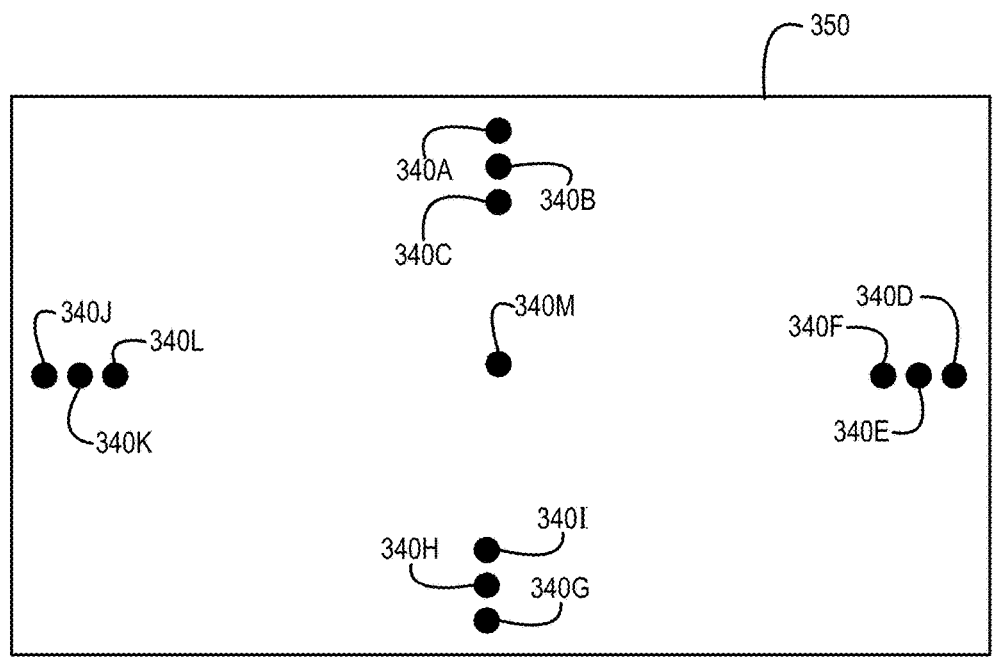
FIG. 3C illustrates examples of positions of a segment of a display, according to one or more embodiments.

Turning now to FIG. 3C, examples of positions of a segment of a display are illustrated, according to one or more embodiments. As shown, positions 340A-340M may be associated with a segment 350 of display 210. In one or more embodiments, segment 350 may be or include segment 310, 320, or 330, among others. In one or more embodiments, a luminance intensity sensor may determine a luminance intensity associated with a position 340. In one or more embodiments, a luminance value for display segment 350 associated with a position 340 may be determined. In one example, a luminance value for display segment 350 associated with a position 340M. For instance, the luminance value for display segment 350 associated with position 340M may be utilized for the luminance value for display segment 350. In another example, multiple luminance values for display segment 350 associated with multiple positions of positions 340A-340M. In one instance, multiple luminance values for display segment 350 may provide a higher resolution. In another instance, a mean of multiple luminance values for display segment 350 may be determined via the multiple positions of positions 340A-340M. Although segment 350 is illustrated as a square, segment 350 may be of any shape and/or any size, according to one or more embodiments.

Figure 4A:
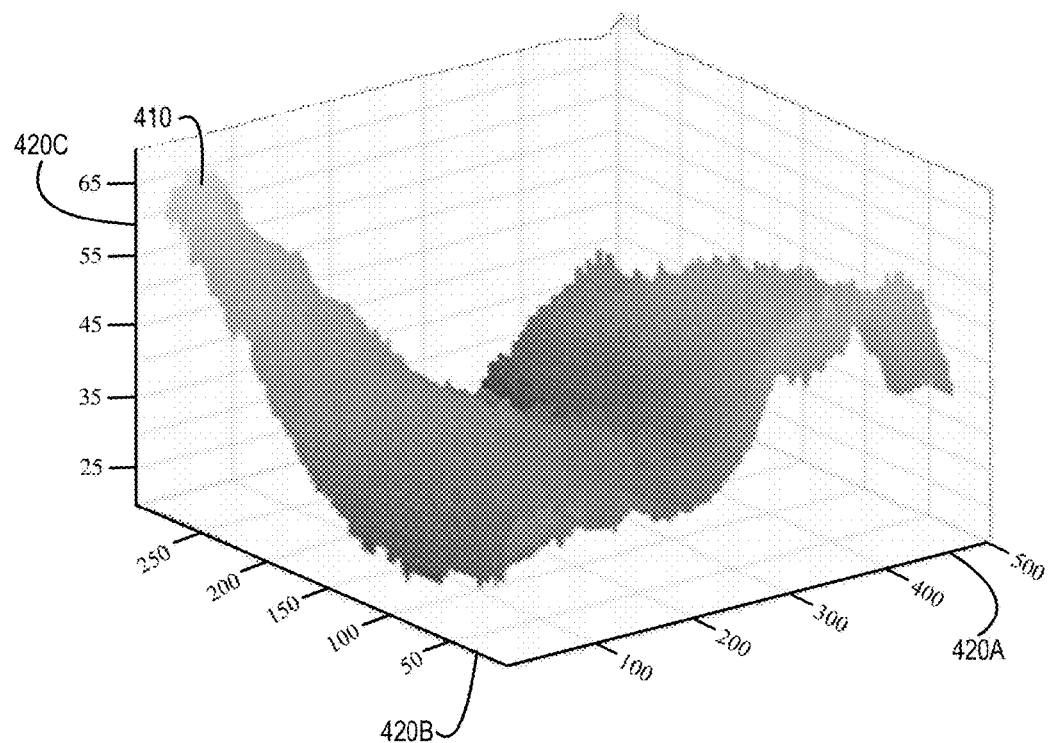
FIG. 4A illustrates an example of a mapping, according to one or more embodiment.

Turning now to FIG. 4A, an example of a mapping is illustrated, according to one or more embodiments. As shown, a mapping 410 may be associated with axes 420A-420C. For example, axes 420A-420C may be associated with an X-axis, a Y-axis, and a Z-axis, respectively. For instance, axes 420A and 420B may be respectively associated with axes 312A and 312B of display 210. In one or more embodiments, axis 420C may be associated with luminance intensity correction values. For example, mapping 410 may be a correction mapping based at least on a mapping from coordinates to multiple mean luminance values and respective multiple expected luminance values. For instance, the correction mapping may be determined based at least on a mapping from coordinates to multiple mean luminance values and respective multiple expected luminance values. In one or more embodiments, mapping 410 may be or include at least one of a continuous function and a discrete function, among others. In one or more embodiments, mapping 410 may be or include a lookup table (LUT). In one or more embodiments, a LUT may include mapping 410. In one or more embodiments, a LUT may be based at least on mapping 410.

Figure 4B:
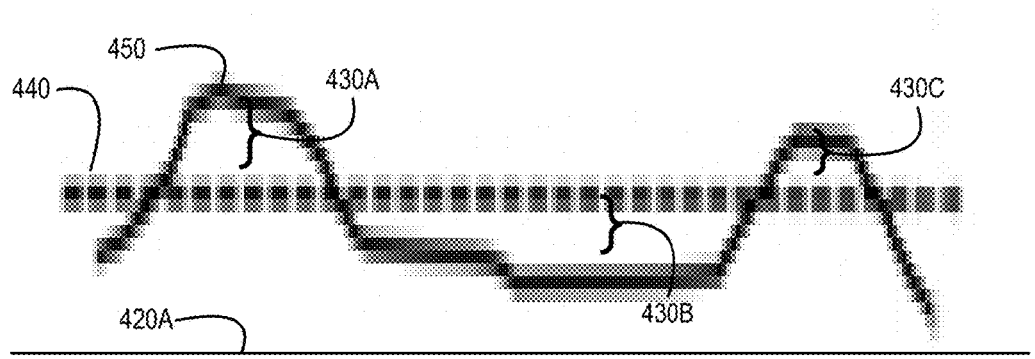
FIG. 4B illustrates examples of correction values, according to one or more embodiments.

Turning now to FIG. 4B, examples of correction values are illustrated, according to one or more embodiments. As shown, correction values 430A-430C may be values from expected luminance values 440. In one or more embodiments, luminance values 450 may be or include mean luminance values from multiple displays 210A-210N. As illustrated, correction values 430A-430C may be from a portion of values associated with axis 420A. For example, a coordinate of axis 420B may be constant, while correction values 430A-430C may be determined by varying coordinates of axis 420A. In one or more embodiments, correction values 430A-430C may be utilized in determining a histogram. For example, the histogram may be utilized in determining a function. For instance, the function may be associated with a curve. In one or more embodiments, correction values 430A-430C may be utilized in fitting a curve based at least on multiple mean luminance values.

In one or more embodiments, a pixel of display 210 associated with correction value 430A may be adjusted so that the pixel of display 210 associated with correction value 430A is less bright. For example, an aperture associated with the pixel associated with correction value 430A may be controlled to be less expanded. In one or more embodiments, a pixel of display 210 associated with correction value 430B may be adjusted so that the pixel of display 210 associated with correction value 430B is brighter. For example, an aperture associated with the pixel associated with correction value 430A may be controlled to be expanded farther.

Figure 5A:
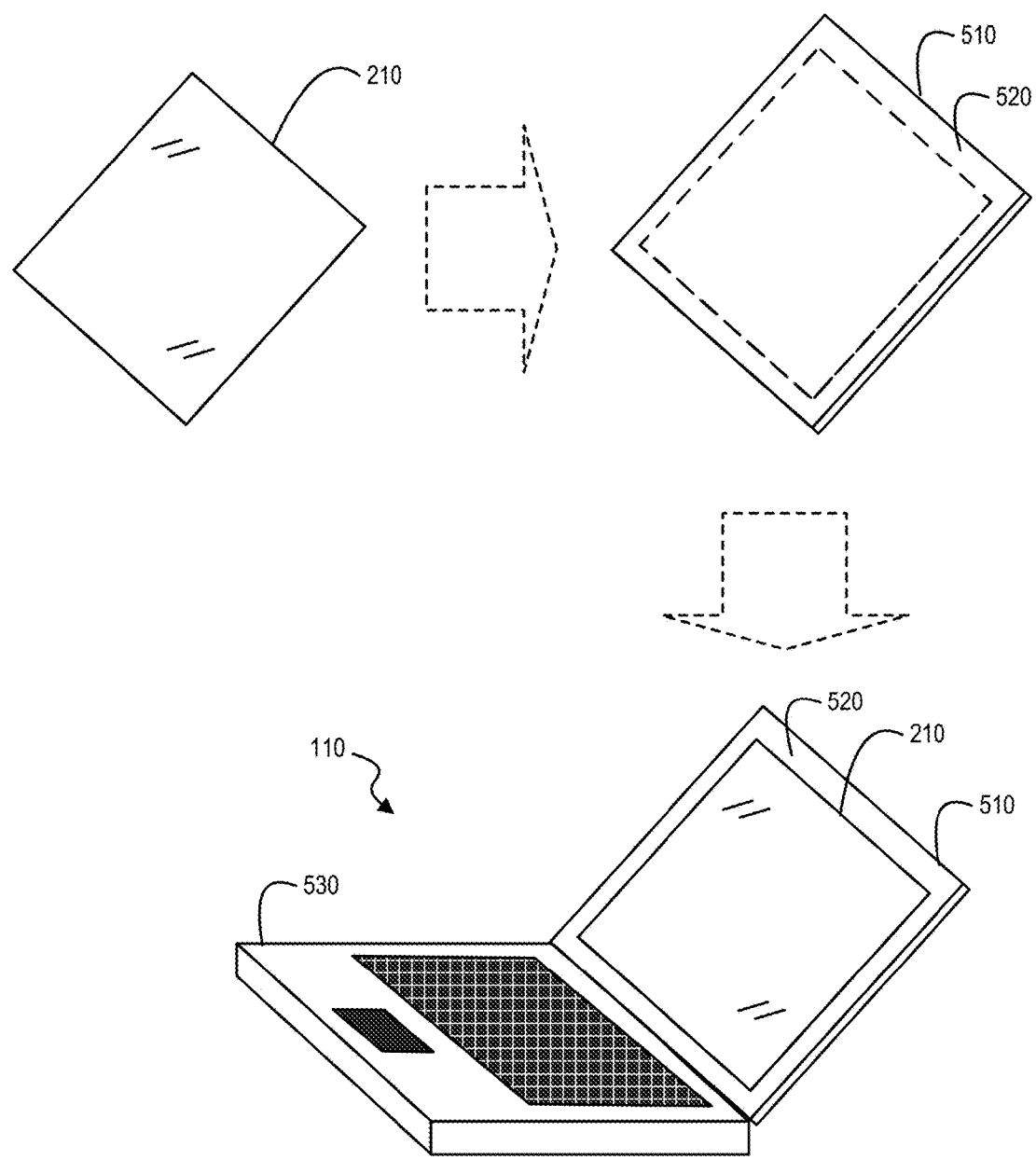
FIG. 5A illustrates an example of a display installed in an information handling system, according to one or more embodiments.

Turning now to FIG. 5A, an example of a display installed in an information handling system is illustrated, according to one or more embodiments. As shown, display 210 may be installed in a lid 510. As illustrated, lid 510 may include a bezel 520. In one or more embodiments, bezel 520 may be around edges of display 210. As shown, lid 510 may be joined with a housing 530. In one or more embodiments, luminance values of display 210 may be determined before display 210 is installed in lid 510. For example, the luminance values of display 210 determined before display 210 is installed in lid 510 may be utilized as expected luminance values associated with display 210. In one or more embodiments, luminance values of display 210 may be determined after display 210 is installed in lid 510. For example, one or more discontinuities of light intensities 220 may be determined after display 210 is installed in lid 510.

Figure 5B:
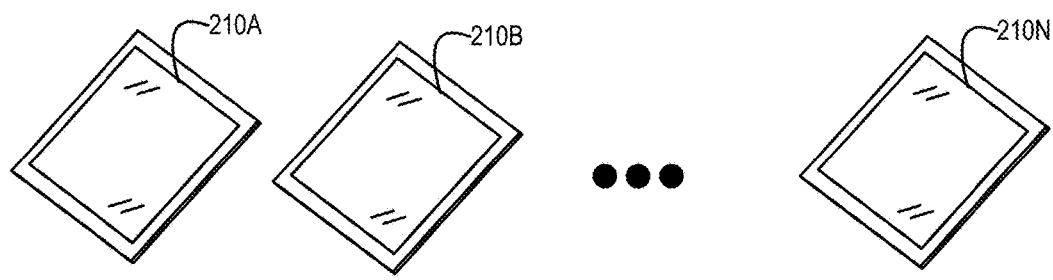
FIGS. 5B and 5C illustrate examples of displays for gathering luminance intensity values, according to one or more embodiments.
Figure 5C:
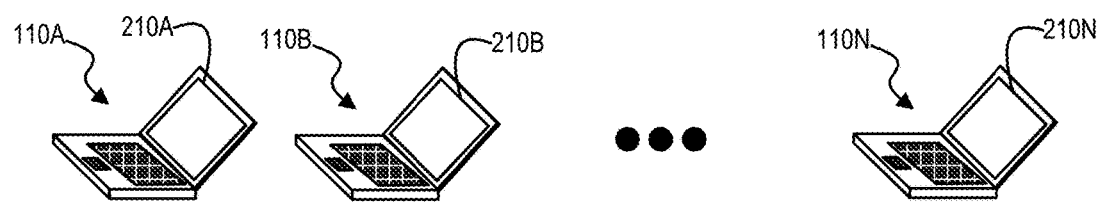

Turning now to FIGS. 5B and 5C, examples of displays for gathering luminance intensity values are illustrated, according to one or more embodiments. As shown in FIG. 5B, luminance values of displays 210A-210N may be determined before being joined with respective housings. As illustrated in FIG. 5C, luminance values of displays 210A-210N may be determined as being included in respective information handling systems (IHSs) 110A-110N.

Figure 6:
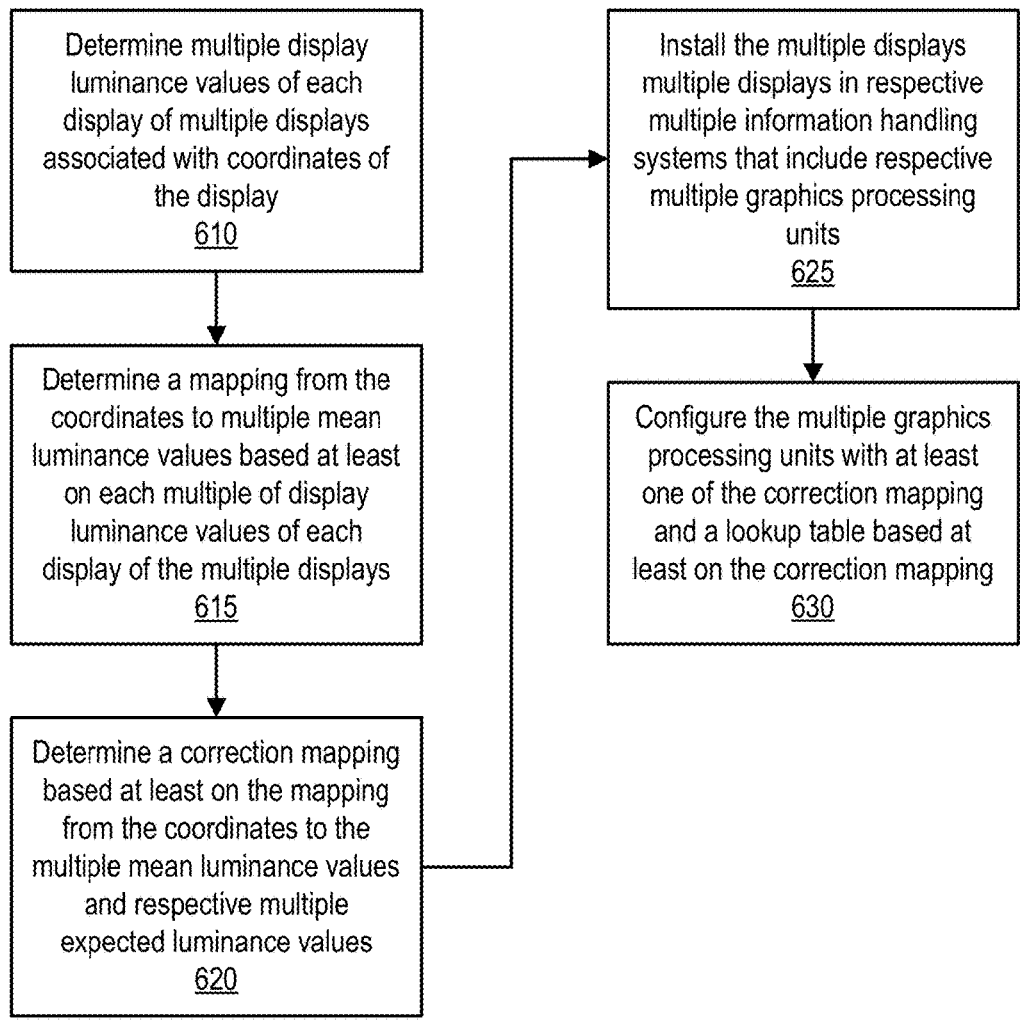
FIG. 6 illustrates an example of a method of configuring a display system, according to one or more embodiments.

Turning now to FIG. 6, an example of a method of configuring a display system is illustrated, according to one or more embodiments. At 610, multiple display luminance values of each display of multiple displays associated with coordinates of the display may be determined. For example, one or more luminance intensity sensors may determine multiple display luminance values of each display 210 of multiple displays 210A-210N associated with coordinates of display 210. In one or more embodiments, a luminance intensity sensor may determine one or more luminance values of segment 350 at respective one or more positions 340. For example, each of the one or more positions 340 may be associated with coordinates of display 210. For instance, each of the one or more positions 340 may be associated with coordinates of axes 312A and 312B. In one or more embodiments, position 340M may be associated with coordinates of segment 350.

In one or more embodiments, determining the multiple display luminance values of each display of the multiple displays associated with coordinates of the display may include capturing a single image for each display of multiple displays. For instance, the one or more luminance intensity sensors may be or include one or more respective cameras. In one or more embodiments, determining the multiple display luminance values of each display of the multiple displays associated with coordinates of the display may include determining the multiple display luminance values of each display of the multiple displays of each single image for each display of the multiple displays.

In one or more embodiments, determining the multiple display luminance values of each display of the multiple displays associated with coordinates of the display may include capturing multiple images for each display of the multiple displays. In one example, an image may be captured for each display segment 310. In a second example, an image may be captured for each display segment 320. In another example, an image may be captured for each display segment 330. In one or more embodiments, determining the multiple display luminance values of each display of the multiple displays associated with coordinates of the display may include determining the multiple display luminance values of each display of the multiple displays from each multiple images of each display of the multiple displays. In one or more embodiments, capturing the multiple images for each display of the multiple displays may include not capturing an inner segment of the display. For example, an image of display segment 320 may not be captured.

At 615, a mapping from the coordinates to multiple mean luminance values may be determined based at least on each multiple of display luminance values of each display of the multiple displays. In one example, a first mean luminance value may be a mean value of luminance values of display segment 310A of displays 210A-210N. In a second example, a second mean luminance value may be a mean value of luminance values of display segment 310B of displays 210A-210N. In another example, a third mean luminance value may be a mean value of luminance values of display segment 330A of displays 210A-210N.

In one or more embodiments, the multiple mean luminance values may be associated with display segments 310A-310R. For example, display segments 310A-310R may be deemed near the edges of display 210. In one instance, the multiple mean luminance values may be associated with display segment 320. In another instance, the multiple mean luminance values may not be associated with display segment 320. In one or more embodiments, display segment 320 may not be utilized. In one or more embodiments, the multiple mean luminance values may be associated with display segments 310A-310R and 330A-330J. For example, utilizing display segments 330A-330J may provide further detail of the mapping. In one or more embodiments, determining the mapping from the coordinates to the multiple mean luminance values based at least on each multiple display luminance values of each display of the multiple displays may include determining multiple arithmetic mean values, multiple geometric mean values, or multiple harmonic mean values, among others.

At 620, a correction mapping based at least on the mapping from the coordinates to the multiple mean luminance values and respective multiple expected luminance values may be determined. For example, mapping 410 may be determined. For instance, the correction mapping may be or include mapping 410. At 625, the multiple displays multiple displays may be installed in respective multiple information handling systems that include respective multiple graphics processing units. For example, displays 210A-210N may be installed in respective IHSs 110A-110N.

Figure 7A:
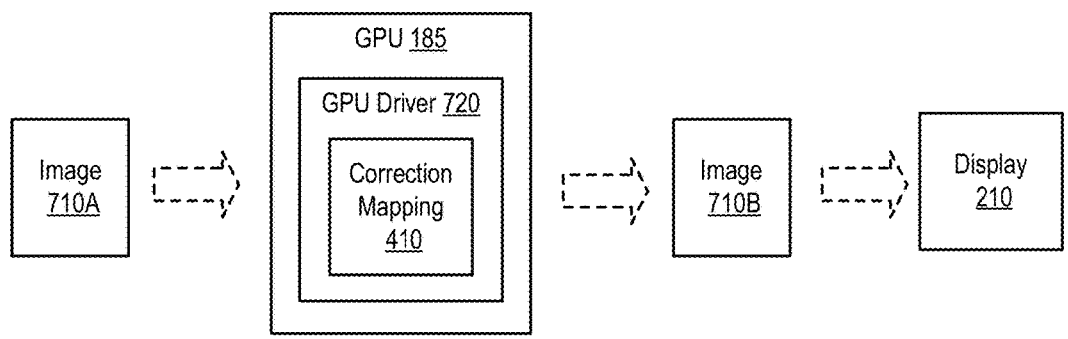
FIG. 7A illustrates a graphics processing unit that includes a graphics processing unit driver, which includes a correction mapping, according to one or more embodiments.
Figure 7B:
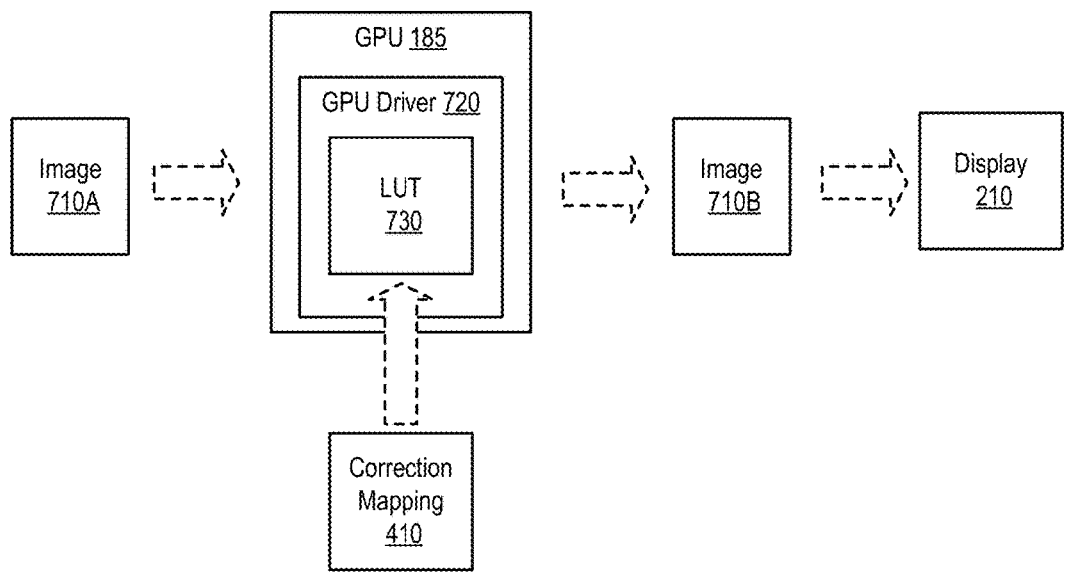
FIG. 7B illustrates a graphics processing unit that includes a graphics processing unit driver, which includes a lookup table, according to one or more embodiments.

At 630, the multiple graphics processing units may be configured with at least one of the correction mapping and a LUT based at least on the correction mapping. For example, each GPU 185 of respective IHSs 110A-110N may be configured with at least one of correction mapping 410 and a LUT 730 based at least on correction mapping 410. In one or more embodiments, configuring a GPU 185 with mapping 410 may include configuring GPU 185 with a GPU driver that may include mapping 410. For example, GPU 185 may include a GPU driver 720 that may include mapping 410, as illustrated in FIG. 7A. In one or more embodiments, GPU 185 may receive an image 710A, as illustrated in FIGS. 7A and 7B. For example, GPU 185 may process image 710A utilizing GPU driver 720 to produce an image 710B. For instance, GPU 185 may provide image 710B to display 210.

In one or more embodiments, correction mapping 410 may be utilized to produce LUT 730, as illustrated in FIG. 7B. For example, GPU driver 720 may include LUT 730. In one or more embodiments, LUT 730 may include precomputed values of a function or a mapping (e.g., correction mapping 410) over a set of inputs. For example, the function or the mapping may be computationally expensive, and the precomputed values of the function or the mapping over the set of inputs may be cached. For instance, table lookups may be performed faster than computing the values from of the function each time a value from the function is requested. In one or more embodiments, LUT 730 may be a multiple dimensional LUT. In one or more embodiments, a value of the function or the mapping from an input that is not included in LUT 730 may be computed from an interpolation process and/or method that may generate reasonable approximations from inputs of LUT 730. For example, the interpolation process and/or method that may generate reasonable approximations from nearby inputs. For instance, the interpolation process and/or method that may generate reasonable approximations by averaging values of the function or the mapping from inputs that are close to and/or nearby the input that does not correspond to a function or mapping value. In one or more embodiments, GPU 185 may perform multiple interpolation processes and/or methods in parallel.

In one or more embodiments, an interpolation process and/or method may generate values for inputs that are within bounds of the inputs of LUT 730 but do not correspond to the inputs of LUT 730. For example, the interpolation process and/or method may generate a value for an input between two of the inputs of LUT 730. In one instance, the interpolation process and/or method may return a nearest table entry (e.g., a value for a requested input, where the value corresponds to an input of LUT 730 that is nearest the requested input). In a second instance, the interpolation process and/or method may compute a weighted average between or among two or more bounding inputs of LUT 730, based at least on a relative distance of the requested input to neighboring inputs of LUT 730 (e.g., linear interpolation). In a third instance, the interpolation process and/or method may compute a value between or among two or more bounding inputs of LUT 730, based at least on the two or more bounding inputs being within a threshold measure of the input value. In another instance, the interpolation process and/or method may compute a curve fit between or among two or more bounding inputs of LUT 730 and output values of the two or more bounding inputs.

In one or more embodiments, GPU 185 may access LUT 730 that includes correction adjustments (e.g., correction adjustment values). For example, GPU 185 may lookup correction adjustments (e.g., correction adjustment values) to coordinates. For instance, GPU 185 may lookup correction adjustment values, from LUT 730, to a first pixel based at least on image 710A with respect to coordinates of display 210. In one or more embodiments, GPU 185 may adjust first brightness settings from correction adjustments (e.g., correction adjustment values) of LUT 730. For example, GPU 185 may compute a brightness setting based at least on a brightness setting associated with a pixel.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:
   determine, via at least one luminance intensity sensor, a plurality of display luminance values of each display of a plurality of displays associated with coordinates of the display;
   determine a mapping from the coordinates to a plurality of mean luminance values based at least on each plurality of display luminance values of each display of the plurality of displays;
   determine a correction mapping based at least on the mapping from the coordinates to the plurality of mean luminance values and a respective plurality of expected luminance values;
   install the plurality of displays in a respective plurality of information handling systems that include a respective plurality of graphics processing units; and
   configure the plurality of graphics processing units with at least one of the correction mapping and a lookup table based at least on the correction mapping.

2. The information handling system of claim 1, wherein each display of the plurality of displays includes a bezel around edges of the display.

3. The information handling system of claim 1, wherein, to determine the mapping from the coordinates to the plurality of mean luminance values based at least on each plurality of display luminance values of each display of the plurality of displays, the instructions further cause the information handling system to determine a plurality of arithmetic mean values, a plurality of geometric mean values, or a plurality of harmonic mean values.

4. The information handling system of claim 1, wherein, to determine the plurality of display luminance values of each display of the plurality of displays associated with coordinates of the display, the instructions further cause the information handling system to:
   capture a single image for each display of the plurality of displays; and
   determine the plurality of display luminance values of each display of the plurality of displays from the single image for each display of the plurality of displays.

5. The information handling system of claim 1, wherein, to determining the plurality of display luminance values of each display of the plurality of displays associated with coordinates of the display, the instructions further cause the information handling system to:
   capture a plurality of images for each display of the plurality of displays; and
   determine the plurality of display luminance values of each display of the plurality of displays from the plurality of images for each display of the plurality of displays.

6. The information handling system of claim 5, wherein, to capture the plurality of images for each display of the plurality of displays, the instructions further cause the information handling system to not capture an inner segment of the display.

7. The information handling system of claim 1, wherein the at least one luminance intensity sensor includes at least one camera.

8. A method, comprising:
   determining, via at least one luminance intensity sensor, a plurality of display luminance values of each display of a plurality of displays associated with coordinates of the display;
   determining a mapping from the coordinates to a plurality of mean luminance values based at least on each plurality of display luminance values of each display of the plurality of displays;
   determining a correction mapping based at least on the mapping from the coordinates to the plurality of mean luminance values and a respective plurality of expected luminance values;
   installing the plurality of displays in a respective plurality of information handling systems that include a respective plurality of graphics processing units; and
   configuring the plurality of graphics processing units with at least one of the correction mapping and a lookup table based at least on the correction mapping.

9. The method of claim 8, wherein each display of the plurality of displays includes a bezel around edges of the display.

10. The method of claim 8, wherein the determining the mapping from the coordinates to the plurality of mean luminance values based at least on each plurality of display luminance values of each display of the plurality of displays includes determining a plurality of arithmetic mean values, a plurality of geometric mean values, or a plurality of harmonic mean values.

11. The method of claim 8, wherein the determining the plurality of display luminance values of each display of the plurality of displays associated with coordinates of the display includes:
   capturing a single image for each display of the plurality of displays; and
   determining the plurality of display luminance values of each display of the plurality of displays from each single image of each display of the plurality of displays.

12. The method of claim 8, wherein the determining the plurality of display luminance values of each display of the plurality of displays associated with coordinates of the display includes:
   capturing a plurality of images for each display of the plurality of displays; and
   determining the plurality of display luminance values of each display of the plurality of displays from each plurality of images of each display of the plurality of displays.

13. The method of claim 12, wherein the capturing the plurality of images for each display of the plurality of displays includes not capturing an inner segment of the display.

14. The method of claim 8, wherein the at least one luminance intensity sensor includes at least one camera.

15. A computer-readable non-transitory memory medium that includes instructions that, when executed by at least one processor of an information handling system, cause the information handling system to:

determine, via at least one luminance intensity sensor, a plurality of display luminance values of each display of a plurality of displays associated with coordinates of the display;

determine a mapping from the coordinates to a plurality of mean luminance values based at least on each plurality of display luminance values of each display of the plurality of displays;

determine a correction mapping based at least on the mapping from the coordinates to the plurality of mean luminance values and a respective plurality of expected luminance values;

install the plurality of displays in a respective plurality of information handling systems that include a respective plurality of graphics processing units; and configure the plurality of graphics processing units with at least one of the correction mapping and a lookup table based at least on the correction mapping.

16. The computer-readable non-transitory memory medium of claim 15, wherein each display of the plurality of displays includes a bezel around edges of the display.

17. The computer-readable non-transitory memory medium of claim 15, wherein, to determine the mapping from the coordinates to the plurality of mean luminance values based at least on each plurality of display luminance values of each display of the plurality of displays, the instructions further cause the information handling system to determine a plurality of arithmetic mean values, a plurality of geometric mean values, or a plurality of harmonic mean values.

18. The computer-readable non-transitory memory medium of claim 15, wherein, to determine the plurality of display luminance values of each display of the plurality of displays associated with coordinates of the display, the instructions further cause the information handling system to:

capture a single image for each display of the plurality of displays; and determine the plurality of display luminance values of each display of the plurality of displays from each single image of each display of the plurality of displays.

19. The computer-readable non-transitory memory medium of claim 15, wherein, to determining the plurality of display luminance values of each display of the plurality of displays associated with coordinates of the display, the instructions further cause the information handling system to:

capture a plurality of images for each display of the plurality of displays; and determine the plurality of display luminance values of each display of the plurality of displays from each plurality of images of each display of the plurality of displays.

20. The computer-readable non-transitory memory medium of claim 15, wherein the at least one luminance intensity sensor includes at least one camera.

* * * * *